Dec. 25, 1951  G. SCHNEIDER  2,579,870
APPLIANCE FOR CLEANING VENETIAN BLINDS
Filed Nov. 15, 1948  3 Sheets-Sheet 1
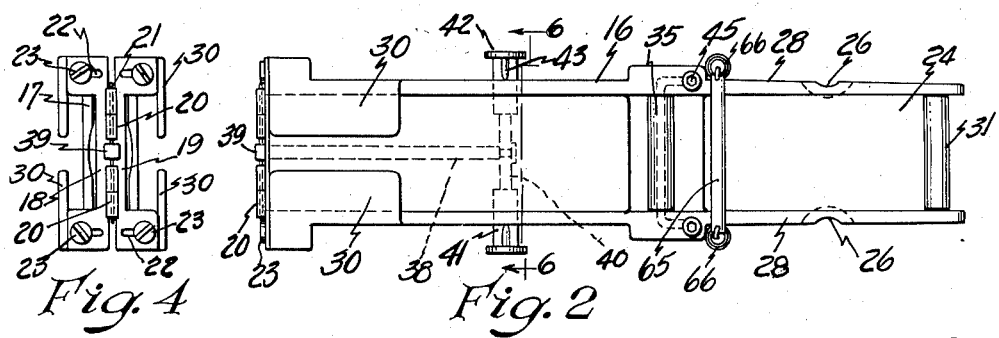
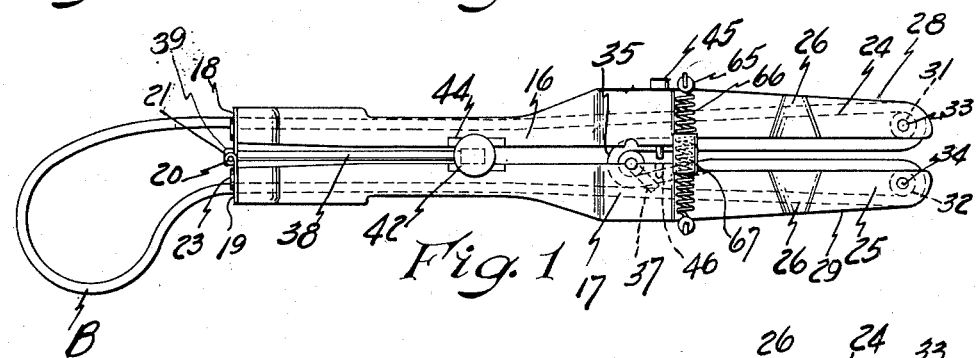
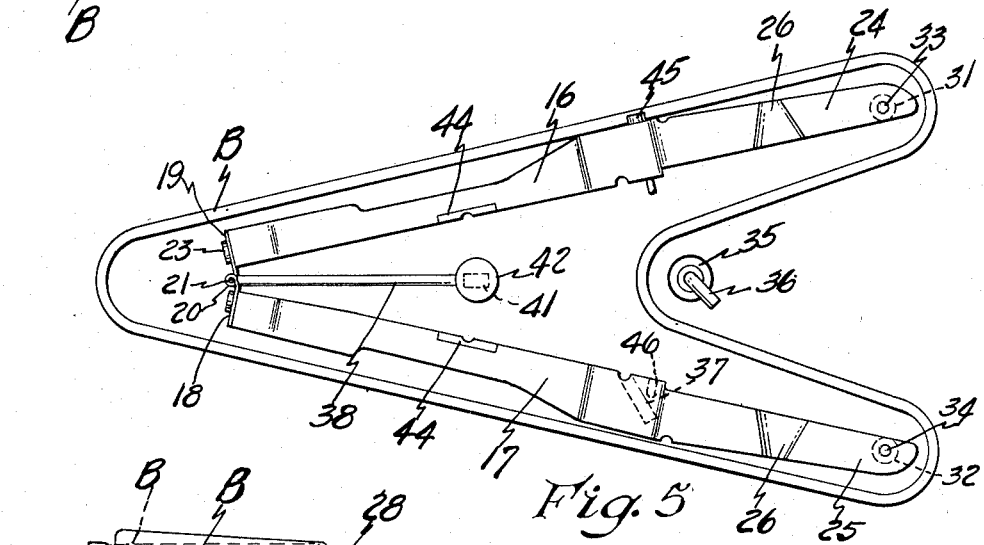
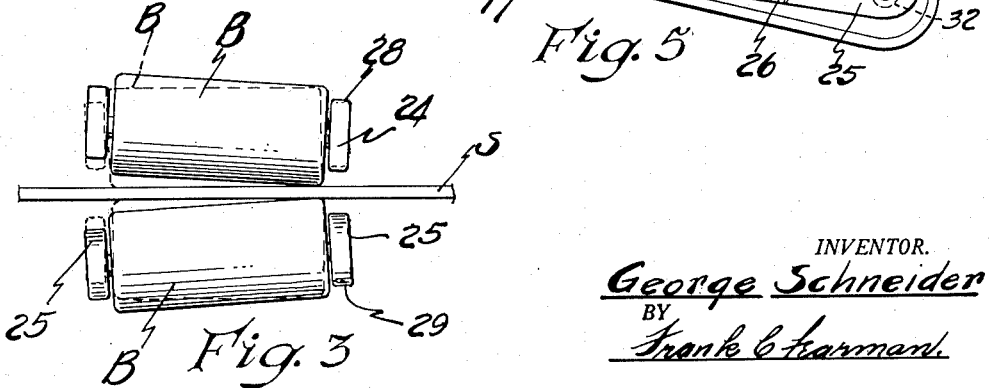
INVENTOR.
George Schneider
BY
Frank C Farman
ATTORNEY Dec. 25, 1951  G. SCHNEIDER  2,579,870
APPLIANCE FOR CLEANING VENETIAN BLINDS
Filed Nov. 15, 1948  3 Sheets-Sheet 2

INVENTOR.
George Schneider.
BY
Frank C. Karman.
ATTORNEY

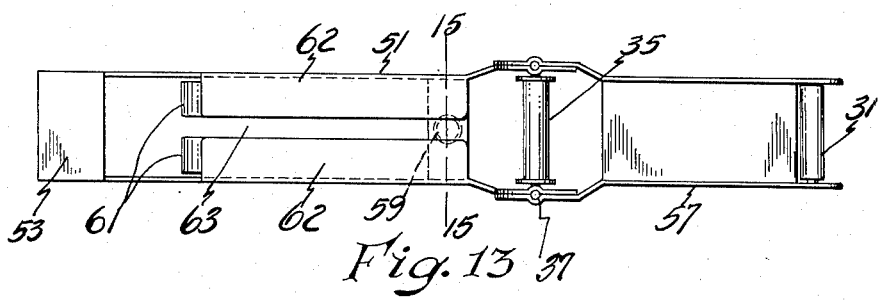
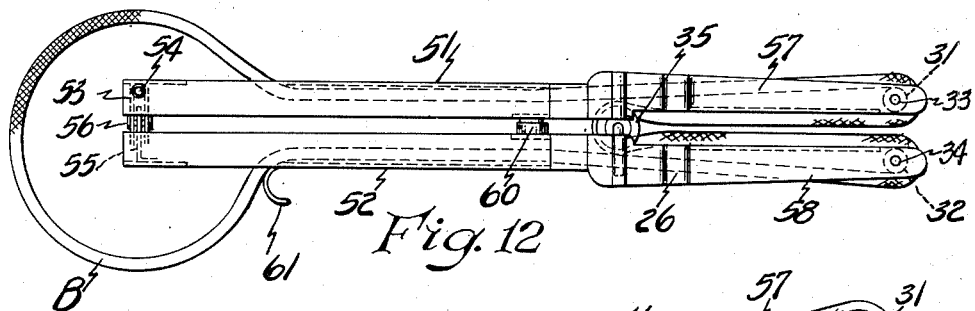
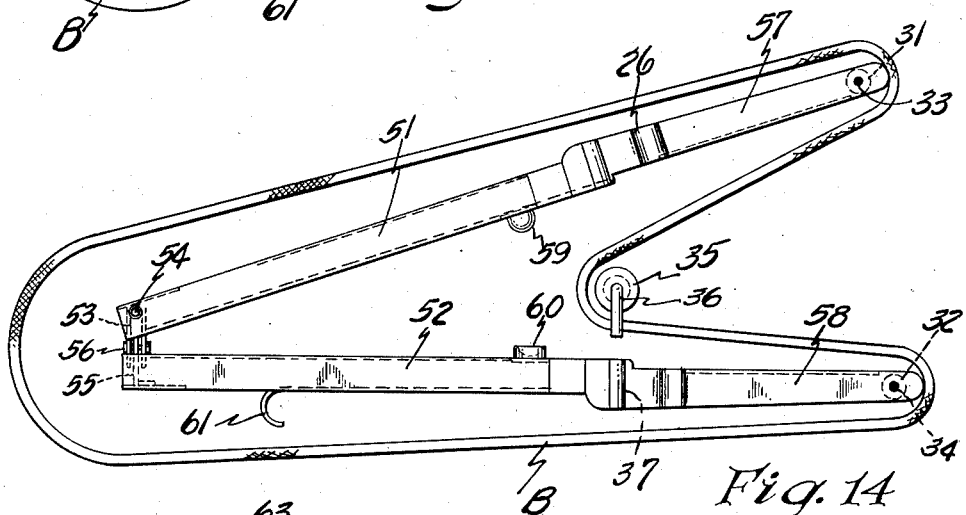
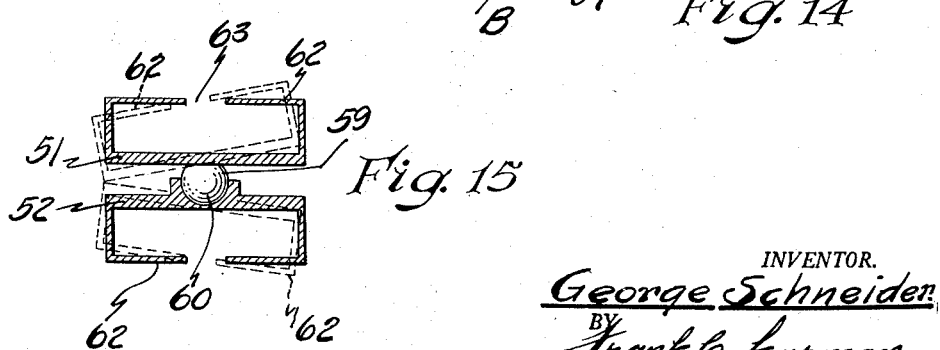

Patented Dec. 25, 1951

2,579,870

UNITED STATES PATENT OFFICE 2,579,870

APPLIANCE FOR CLEANING VENETIAN BLINDS

George Schneider, Saginaw, Mich., assignor to Blind Cleaners, Inc., Saginaw, Mich., a corporation of Michigan Application November 15, 1948, Serial No. 60,029

12 Claims. (Cl. 15—231)

This invention relates to an appliance for cleaning the louvers or slats of Venetian blinds, and more particularly to an appliance which cleans the individual slats without the disassembly or removal of the slats from the blind or the shade from the window.

One of the prime objects of the invention is to design a manually actuated cleaning appliance equipped with an adjustable endless wiper belt, which belt is dampened to take up dust and dirt from the opposite sides of the louvers or slats as the appliance is operated.

Another object is to design a very simple, practical, and inexpensive cleaning appliance, including opposed hingedly connected handle sections terminating in jaws, said handle sections being mounted for rocking movement with relation to each other, the jaws forming a V-shaped opening when rocked, with the edges on the one side in close, intimate contact, the opposite edges being spaced-apart and out of wiping contact with the slat, the closed edges forcing any accumulation of dirt (not absorbed by the belt), along the slat and trapping it in the central area of the belt as the handle is rocked in the opposite direction and the appliance moved in the opposite direction on the slat, thus facilitating the cleaning or wiping action, and eliminating the possibility of dirt being pushed along by the edges of the belt.

A further object is to provide a cleaning means including a continuous, endless belt which can be readily mounted and removed when desired, and which can be readily advanced to present a clean surface area to the work when desired.

Another object is to provide a slat cleaning appliance, including opposed, belt-lined, slat-accommodating jaws with a readily removable idler roller therebetween, and provide means for resiliently forcing said jaws toward each other.

Still a further object is to provide a cleaning appliance, the jaws of which can be shaped to fit the curvature of the slats, and provide vertical grooves in the edges of the jaws to accommodate the conventional Venetian blind lift cords, so that the slat area, in transverse alignment with the lift cord, will be overlapped by the cleaning belt, thus insuring the entire slat surface being thoroughly cleaned.

A further object still is to provide a very simple and economical slat cleaning appliance equipped with a continuous, washable, cleaning belt, which belt can be easily and quickly placed in position, which is readily adjustable to bring a clean section of the belt into working position, and which can be easily removed for washing and/or replacement when desired.

Still a further object is to provide a slat cleaning appliance, which can be readily manufactured and assembled, which is convenient for use, and by means of which Venetian blind slats can be readily and easily cleaned.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit or sacrificing any of the advantages of the invention.

In the drawings:

Fig. 1 is an edge-elevational view of my slat cleaning appliance with the endless belt in position.

Fig. 2 is a top, plan view with the endless belt omitted.

Fig. 3 is an enlarged, front-elevational view, the broken lines showing the jaws in engagement with a Venetian blind slat, the solid lines illustrating the rocking action.

Fig. 4 is an end-elevational view of the appliance with the belt omitted.

Fig. 5 is a view similar to Fig. 1 and showing the idler roller disengaged and the jaws in open position to permit removal of the belt.

Fig. 12 is an edge-elevational view showing a slightly modified design in which the device is formed of stampings.

Fig. 13 is a top, plan view with the belt omitted.

Fig. 14 is a view showing the device in open position to permit removal or replacement of the wiper belt.

Fig. 15 is a transverse-sectional view taken on the line 15—15 of Fig. 13, the broken lines illustrating the rocking action.

Figure 6:
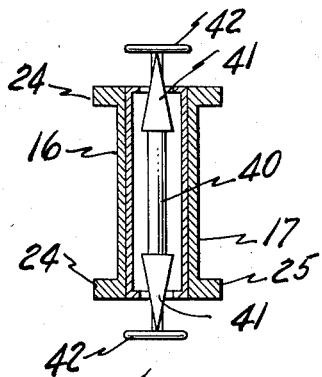
Fig. 6 is an enlarged, transverse-sectional view taken on the line 6—6 of Fig. 2.

Referring now more specifically to Figs. 1 to 7 inclusive of the drawings in which I have shown one embodiment of my invention, and in which the numerals 16 and 17 indicate the upper and lower handle sections of the appliance which are hingedly connected by means of hinge plates 18 and 19, each hinge plate being formed with rolled sections 20 adapted to accommodate a pin 21, and slots 22 are provided in the plates and accommodate screws 23 which are mounted in the end walls of the handle sections so that the sections may be rocked with relation to each other and in a manner to be presently described.

These handle sections are preferably constructed of lightweight material and terminate in jaw sections 24 and 25, the edges of which are vertically grooved as at 26 to accommodate the lift cords 27 of a Venetian blind (not shown).

Upwardly projecting rib sections 28 and 29 are provided on the edges of the sections 16 and 17, these ribs forming tracks and guides for an endless belt "B" which travels therebetween, and inwardly projecting flanges 30 are provided on the handle sections to cover the belt and shield the user's hand from contact therewith as the appliance is operated. Rollers 31 and 32 are mounted on the forward end of the jaw sections 24 and 25, and include shafts 33 and 34 which are journaled in the rib sections 28 and 29, and the wiper belt "B" is trained over said rollers.

An idler roller 35 is mounted on the lower jaw 25 and is journaled on the pin 36, the ends of which are bent and accommodated in angularly disposed sockets 37 provided in the side wall of the lower jaw section. The wiper belt "B" is trained around the idler roller 35, thence leading outwardly and over the guide rollers 31 and 32, thence leading rearwardly over the exposed faces of the handle sections, and in under the flanges 30 as clearly shown in Fig. 2 of the drawings, thus providing a neat, compact assembly in which the belt can be advanced to bring a clean, unused section into position between the jaws when desired.

To prevent an accumulation of dirt being pushed along the slat by the edges of the wiper belt as the appliance is operated, I arrange to rock the handle sections transversely with relation to each other, so that the edges of the jaws on the one side of the appliance are spread, while the opposite edges are brought close together and vice versa, as the appliance is operated, thus providing a wedge-shaped opening, open in the direction in which the appliance is moved, and this I accomplish by means of a horizontally disposed pin 38 interposed between the handle sections 16 and 17, said pin being connected to the hinge pin 21 at the point 39, the opposite end being secured to a transversely disposed member 40 which is formed with wedge-shaped sections 41 terminating in finger rests 42.

Ribs 43 are provided on the wedge-shaped sections 41 and engage hardened wear plates 44 provided in the edges of the handle sections, and as the operator moves the appliance to the right, he first pushes one of the rests 42 inwardly to spread the jaw sections on the right hand side of the appliance, so that the dirt will be trapped by the main body or area of the belt instead of being pushed along by the edges of the belt; when the appliance is moved to the left, the handle is rocked in the opposite direction to provide a larger jaw opening on the left hand side, thus trapping the dirt and bringing a much larger area of the wiper belt into contact with the upper and lower surface of the slat.

Dowel pins 45 are provided on one of the handle sections as shown, and engage sockets 46 provided in the opposite section as the members are rocked, thus holding the sections in proper position and alignment.

Figure 7:
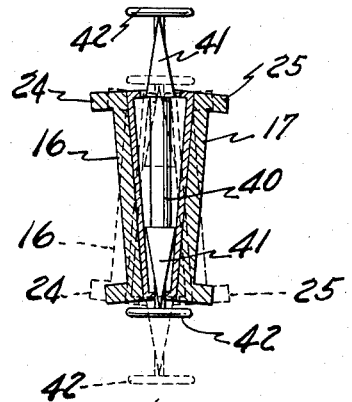
Fig. 7 is a view similar to Fig. 6, the broken lines illustrating the rocking action.
Figure 9:
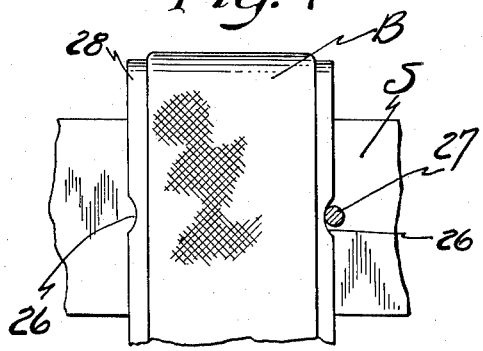
Fig. 9 is a fragmentary, plan view showing the jaws in position on a slat with the tilt cord nested in the groove in the side wall of the jaws.

In practice, the appliance is placed over a louver or slat so that both sides of the slat are engaged by the wiper belt (see Fig. 9 of the drawings), and when the appliance is moved to the right, one of the members 42 is actuated to rock said handle section and spread the right hand edges of the jaws (see Figs. 3 and 7 of the drawings), and on the return stroke when moving to the left, the sections are rocked in the opposite direction and as indicated in broken lines in Fig. 7.

Figure 8:
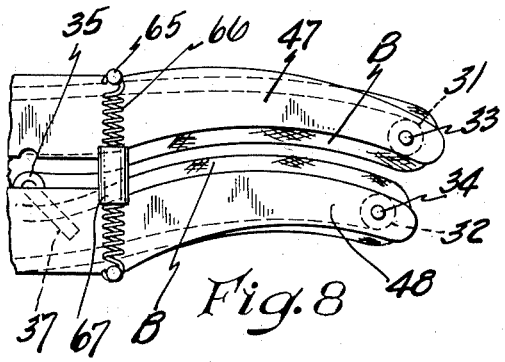
Fig. 8 is an enlarged, fragmentary, edge-elevational view showing a pair of curved jaws as used to clean crowned slats.

In Fig. 8 of the drawings, I have shown jaw sections 47 and 48 which are curved to accommodate the curved or crowned slat construction (not shown), otherwise, the construction is identical with that previously described.

Figure 10:
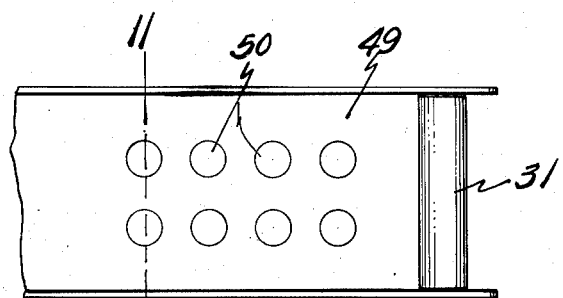
Fig. 10 is a fragmentary, plan view showing a modified jaw construction equipped with openings in the face thereof, these openings serving as a means to prevent sidewise movement of the wiper belt on the jaws.
Figure 11:
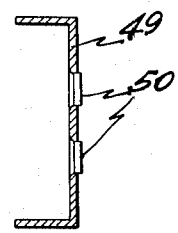
Fig. 11 is a section taken on the line 11—11 of Fig. 10.

In Figs. 10 and 11 of the drawings, I have shown the jaw sections formed of stampings, the section 49 having a plurality of openings 50 or other slits or serrations (not shown), therein, these openings forming means which tends to grip the wiper belt "B" and prevent sidewise slippage thereof.

In Figs. 12 to 15 inclusive, I have shown another modification in which the handle sections 51 and 52 are formed of stampings, a hinge plate 53 being pivotally connected to the section 51 by means of the pin 54; a similar plate 55 is secured to the handle section 52 and a pin 56 serves to rockably connect the sections which terminate in jaws 57 and 58 as usual.

This construction also incorporates a modified rocking member arrangement in which a ball 59 is fixed on the upper handle section 51 and is journaled in a socket 60 provided on the lower section 52, so that tipping the sections transversely with relation to each other provides a smooth, rocking action.

The belt assembly and operation is exactly the same as that above described, and rolled ends 61 form a part of the flange sections 62 which cover the wiper belt, these flanges serving to prevent the workman's hands coming into intimate contact with the wet wiper belt.

To remove the belt, it is merely necessary to spread the jaws (see Fig. 14 of the drawing); raise the idler roller 35 free of the socket 37, and the one edge is then drawn through the slit 63 between the flanges 62 and the belt is free.

The blind slats are usually cleaned while in position, but when desired or necessary, the entire blind can be removed from its brackets and hung on a suitable hanger (not shown) in a workshop or room.

In use, the wiper belt is first moistened and placed in position in the appliance. The jaws of the appliance are then spread to accommodate the slat therebetween; the handles are rocked as previously described, and the appliance is then advanced sidewise along the slats until the vertical grooves in the edges of the jaws engage the lift cord 27.

The appliance is then removed and replaced on the opposite side of the lift cord with the cord accommodated in the groove 26, thereby overlapping the cleaned area in transverse alignment with the lift cord, so that there will be no accumulation of dirt at this point.

As the cleaning progresses, the handles are rocked each time the direction of stroke is changed, thus trapping and absorbing all dirt in the central area of the belt.

In practice, I find that after a certain area or footage of slats have been moistened and cleaned, that the belt area at work or in contact will become dirty, leaving the surfaces of the slats somewhat streaky. When this occurs, I advance the belt to bring a completely clean area into working position, and this I use to finish clean the streaks etc., continuing on to moisten and rough clean an additional number of slats and until the belt-working area is again dirty, at which time the belt is again advanced to provide a clean area.

The belts are laundered when dirty and are useable over and over again until worn out, and while in the instant application I have shown certain means for providing a rocking motion of the handles with relation to each other, it will be obvious that this may be accomplished in many ways, and I do not wish to be limited to any specific manner of accomplishing it.

When using the appliance shown in Figs. 12, 13 and 14, the operator grips and squeezes the handles to provide pressure on the jaws, but in Figs. 1, 2 and 8 of the drawings, I have shown means for resiliently pressing the jaws 24 and 25 towards each other, said means comprising transversely disposed bars 65 which bear on the respective jaws, and springs 66 are connected to the ends of the bars as shown, a rubber ferrule 67 fitting over each spring as shown to eliminate possibility of marring or chipping the paint on the slat as the appliance is operated. When removing the wiper belt, the bar and spring arrangement are first removed.

From the foregoing description, it will be clearly obvious that I have perfected a very simple, practical and relatively inexpensive slat cleaning device for Venetian blinds and the like.

What I claim is:

1. In a cleaning appliance of the class described, comprising a pair of rigid handle sections hingedly connected together at one end, a pair of jaw sections on the opposite end, a transversely disposed manually operable pin spanning said handles for tilting them with relation to each other, guide rollers mounted on the ends of said jaw sections, a shaft and idler roller mounted between said jaw sections and at a point spaced inwardly from the guide rollers, and an endless belt trained over said handle sections, thence inwardly over the guide rollers and around the idler roller with the inner faces of the jaws covered by said belt.

2. The combination defined in claim 1 in which the ends of the shaft for the idler roller are downwardly turned, and sockets in one of said jaw sections adapted to detachably accommodate said downwardly turned ends of the idler roller shaft.

3. The combination as defined in claim 1 in which the handle sections are formed with inwardly extending, overhanging flanges forming a belt passage between the outer face of the handle sections and said flanges.

4. The combination set forth in claim 1 in which guide pins are provided on one of said handle members for engagement with sockets provided in the companion handle member as the handle members are rocked.

5. A slat cleaning appliance of the class described comprising a pair of handle sections, channel-shaped in cross section, said handles being loosely hingedly connected at their one end, said sections being rockable transversely with relation to each other, and terminating in opposed jaw members provided with guide rollers journaled on the free ends thereof, an idler roller mounted between said jaw sections at a point spaced inwardly from the guide rollers and detachably mounted on one of said sections, and an endless cleaning belt trained over said idler roller, guide rollers, and handle sections respectively.

6. The construction defined in claim 5 in which a ball is mounted on one section, and a socket on the companion section to permit a rocking movement of one member with relation to the other.

7. A slat cleaning appliance of the class described comprising upper and lower handle sections hingedly connected at one end and terminating in opposed jaw sections, an idler roller mounted on one of said jaw sections, an endless wiper belt trained around said idler roller and over said jaw and handle sections to form a facing for the inner faces of the jaws, and means for rocking said handles and jaws with relation to each other.

8. The combination defined in claim 7 in which webs are provided on the edges of said jaw sections, and inwardly turned flanges on the handles and forming a passage to accommodate said wiping belt.

9. In a slat cleaning appliance of the class described, comprising upper and lower rigid handle sections, a hinge including a pin loosely connecting the respective handles at one end thereof to permit limited, transverse, rocking movement of said handles with relation to each other, said handles terminating in opposed jaw sections, and a continuous belt trained over and between said jaw sections, and forming a facing for the inner surfaces thereof.

10. The combination as defined in claim 9 in which a horizontally disposed pin is connected to the hinge pin of the hinge, a transversely disposed pin interposed between and spanning the handles and connected to said horizontally disposed pin, and wedge-shaped sections on the transversely disposed pin for rocking said jaws as the transversely disposed pin is actuated.

11. The structure set forth in claim 9 in which vertical grooves are formed in the edges of the jaw members to accommodate the lift cords of a Venetian blind therein.

12. The combination defined in claim 9 in which an idler roller is releasably mounted on one of said jaw sections at a point spaced inwardly from the outer free ends of the handles and around which the belt is trained.

GEORGE SCHNEIDER.

REFERENCES CITED

The following references are of record in the file of this patent:

UNITED STATES PATENTS

| Number | Name | Date |
|---|---|---|
| 1,117,757 | Austin | Nov. 17, 1914 |
| 2,139,537 | Bassin | Dec. 6, 1938 |
| 2,452,107 | Cranney | Oct. 26, 1948 |